Sept. 20, 1938.  W. B. CAMPBELL  2,130,338
VOTING MACHINE
Filed Feb. 24, 1934   10 Sheets-Sheet 1

INVENTOR.
Wendell B. Campbell
BY
ATTORNEY.

Sept. 20, 1938.    W. B. CAMPBELL    2,130,338
VOTING MACHINE
Filed Feb. 24, 1934    10 Sheets-Sheet 2

INVENTOR.
Wendell B. Campbell
BY
Leo N. Parker
ATTORNEY.

Sept. 20, 1938.  W. B. CAMPBELL  2,130,338
VOTING MACHINE
Filed Feb. 24, 1934  10 Sheets-Sheet 3

INVENTOR.
Wendell B. Campbell
BY
ATTORNEY.

Sept. 20, 1938.  W. B. CAMPBELL  2,130,338
VOTING MACHINE
Filed Feb. 24, 1934   10 Sheets-Sheet 5
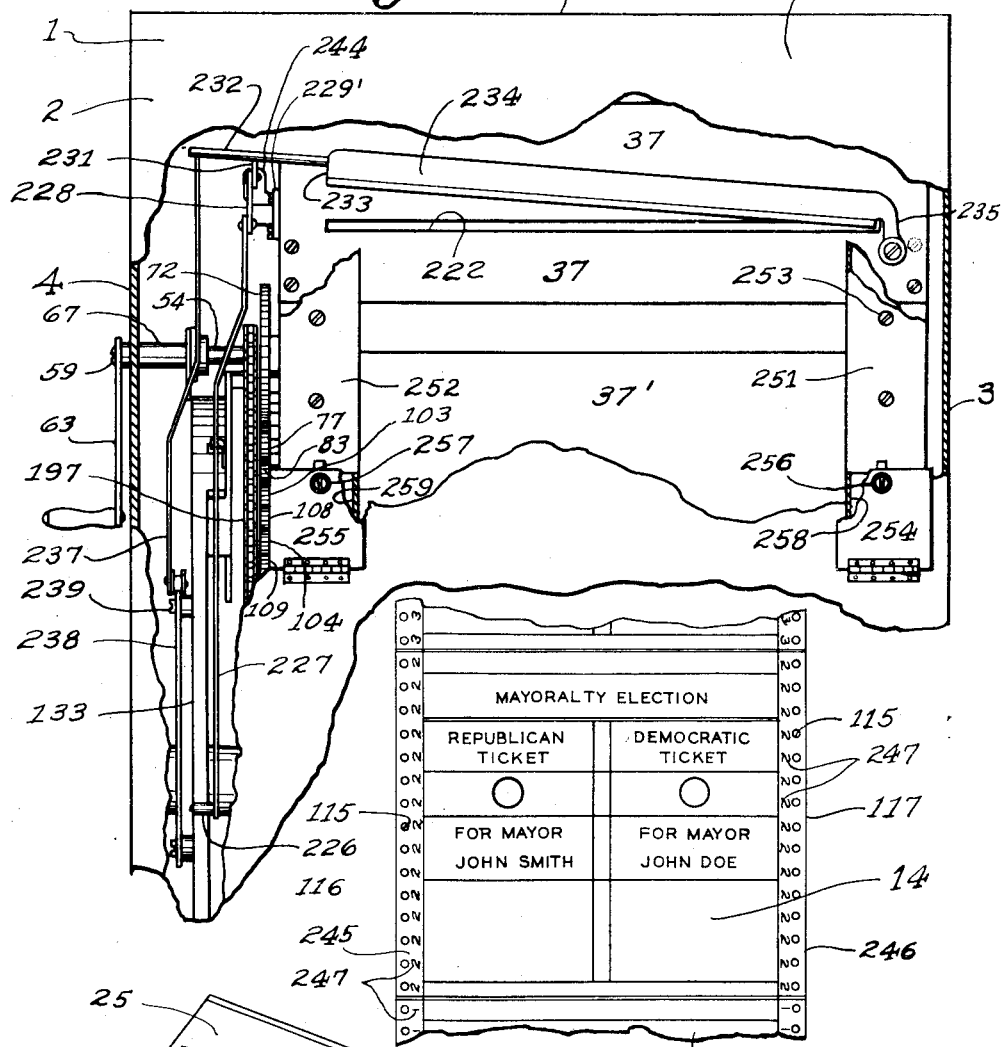
Fig. 6.
Fig. 7.
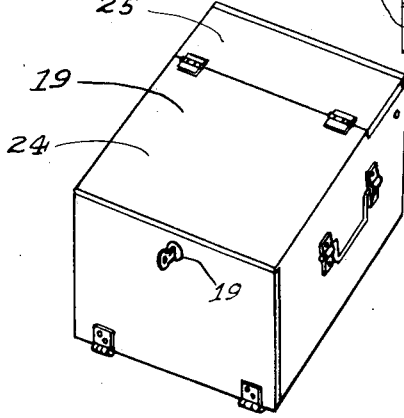
Fig. 8.
INVENTOR.
Wendell B. Campbell
BY
ATTORNEY.

Sept. 20, 1938.  W. B. CAMPBELL  2,130,338
VOTING MACHINE
Filed Feb. 24, 1934    10 Sheets-Sheet 6
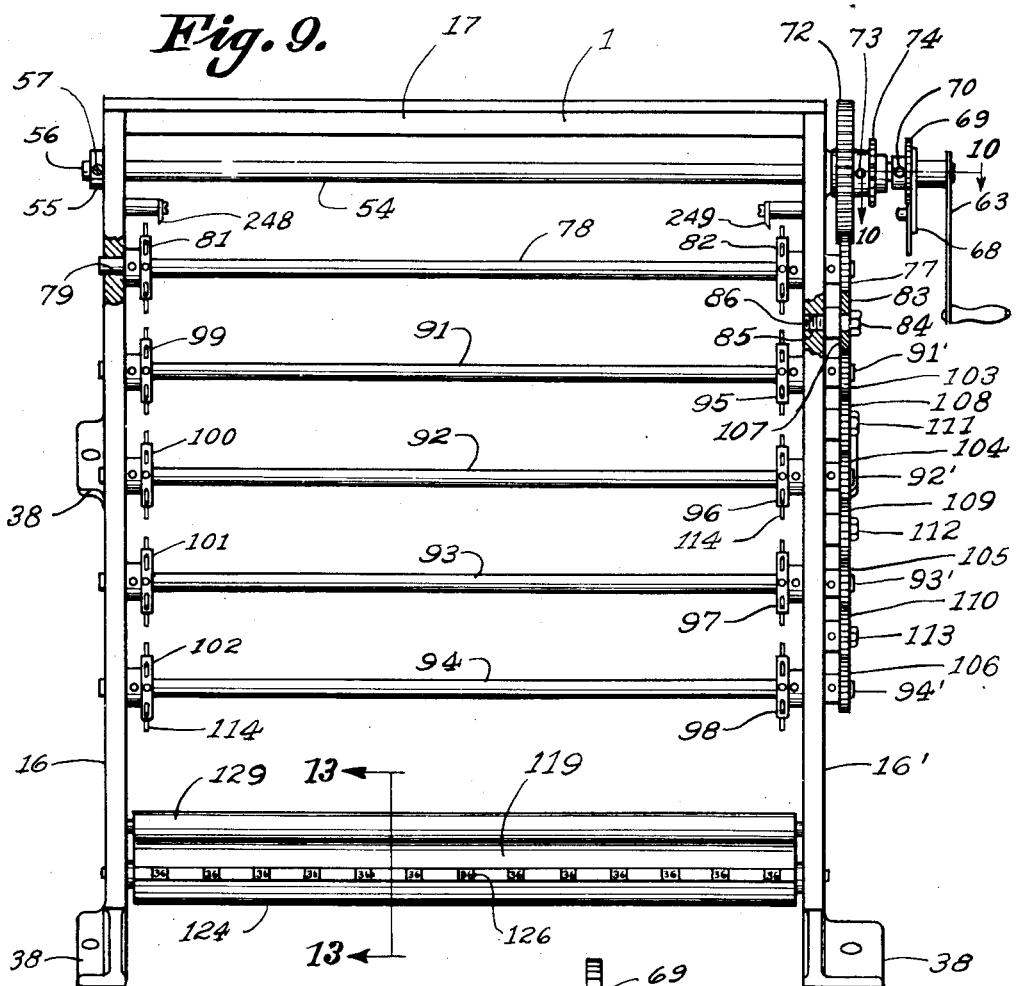
Fig. 9.
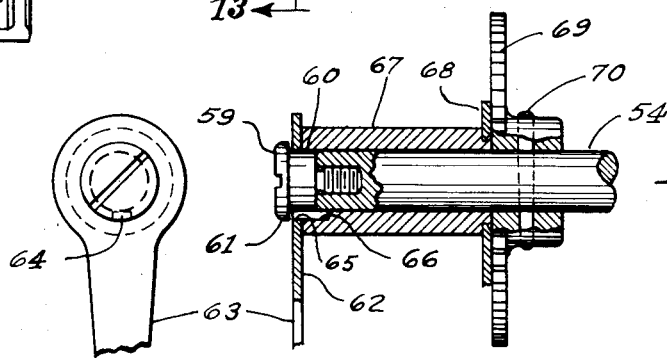
Fig. 10.
Fig. 11.
INVENTOR.
Wendell B. Campbell
BY Leo A. Parker
ATTORNEY.

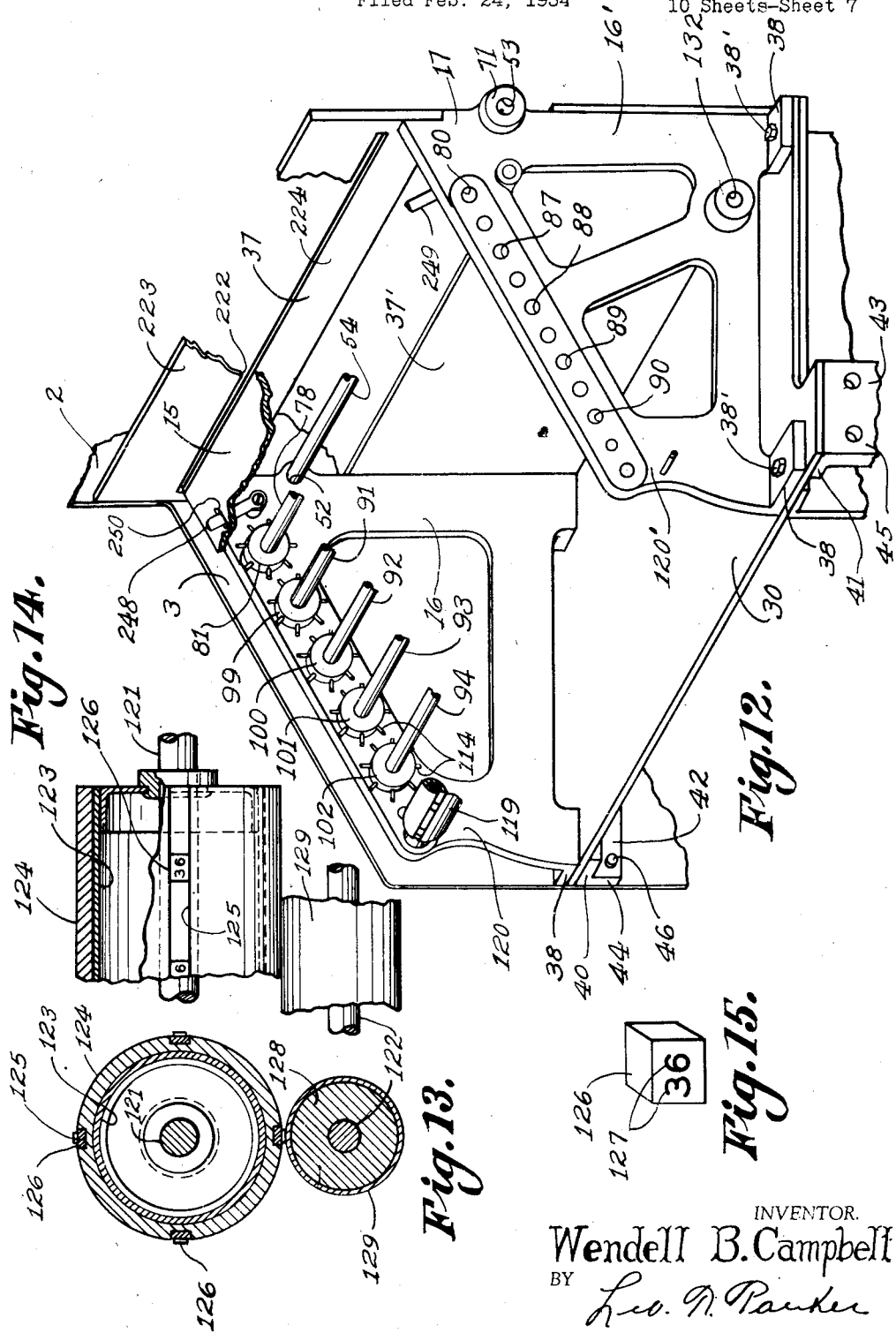

Sept. 20, 1938.　　W. B. CAMPBELL　　2,130,338
VOTING MACHINE
Filed Feb. 24, 1934　　10 Sheets-Sheet 8

INVENTOR.
Wendell B. Campbell
BY Leo T. Parker
ATTORNEY.

Sept. 20, 1938.   W. B. CAMPBELL   2,130,338
VOTING MACHINE
Filed Feb. 24, 1934   10 Sheets—Sheet 9
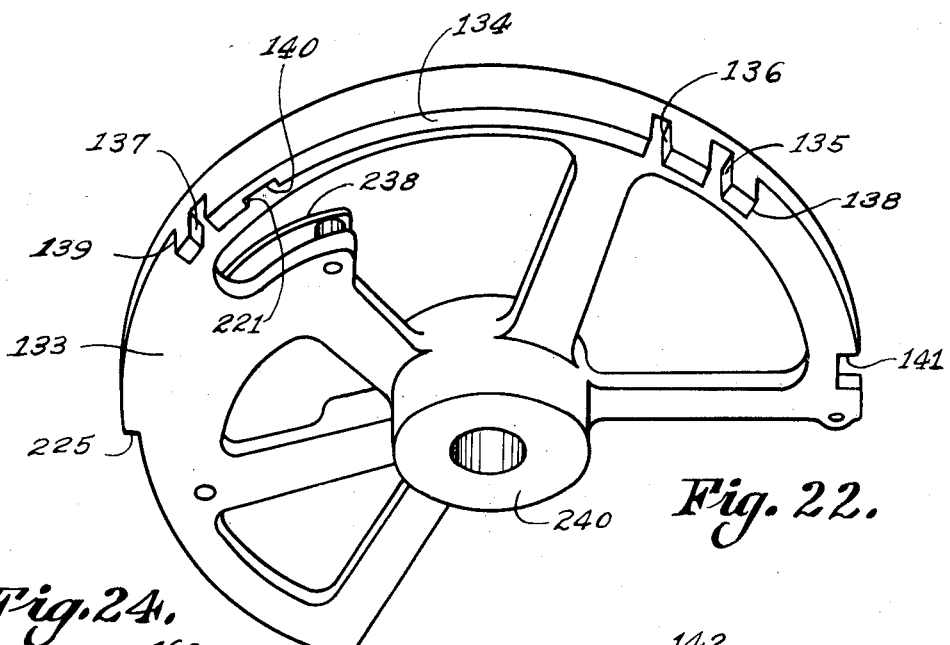
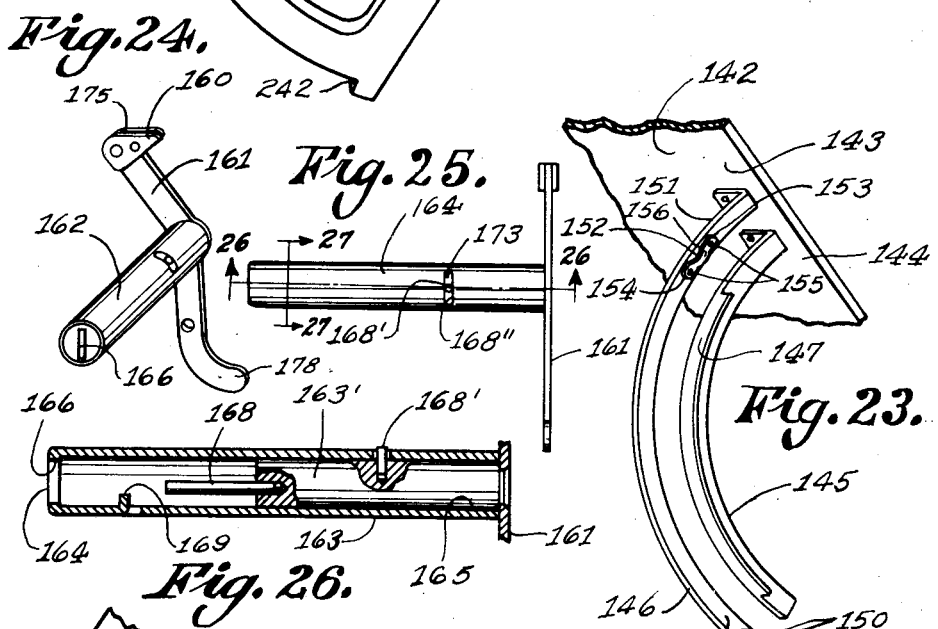
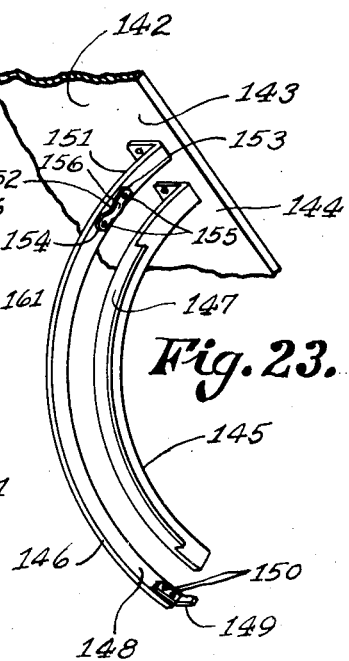
INVENTOR.
Wendell B. Campbell
BY
ATTORNEY.

Sept. 20, 1938.       W. B. CAMPBELL       2,130,338
VOTING MACHINE
Filed Feb. 24, 1934       10 Sheets—Sheet 10

INVENTOR.
Wendell B. Campbell
BY
Leo N. Parker
ATTORNEY.

Patented Sept. 20, 1938

2,130,338

UNITED STATES PATENT OFFICE 2,130,338

VOTING MACHINE

Wendell B. Campbell, Morrow, Ohio

Application February 24, 1934, Serial No. 712,771

12 Claims. (Cl. 235—50)

The invention relates to voting machines utilizing ballots or forms for recording an expression of the elector's choice as between candidates or propositions to be voted for.

The method of secret voting was first practiced in the sixteenth century. At that time each person, who was entitled to vote, had the choice of two balls, one white and one black. The elector placed a white ball in an urn or a box, called a ballot box, if he was in favor of the resolution proposed, or a black ball if he was opposed to it. Later the written ballot and the viva voce ballot systems were adopted. In the former the ballots or voting papers were so folded as to prevent the voter's preference from being disclosed and the same were handed to an authorized officer, usually termed inspector of elections, to be deposited in the ballot box in the voter's presence. In the latter system the voter simply verbally informed the proper officials of his choice and such officials made written notation of the same for future reference when the votes were to be counted and properly classified. The viva voce system of voting has been practically discontinued. The written ballot system is now employed in almost all popular elections, such as those in the United States, throughout the United Kingdom and the British Colonies and in the national or parliamentary elections and almost all countries of continental Europe and other parts of the world.

There are several important objections to the conventional written ballot system, the important ones being as follows: Various illegal methods have been pursued without great difficulty, as for instance illegal ballots are substituted and put into the ballot box and the original ballots are removed therefrom and destroyed; bottom ballot is removed from the stack of ballots and delivered to an outside party who marks the ballots of subsequent voters, each in turn bringing out of the election booth a new unmarked ballot, and otherwise may perform illegal acts when subsequent voters deliver their ballots to him; all ballots must be handled by another person besides the voter and frequently the ballots are damaged when the stubs are removed therefrom and the idea persists that by legerdemain or otherwise illegal ballots are substituted for legal ones. Also, confusion often results among voters in election booths because such voters cannot be arranged in positive lines when obtaining ballots, walking to voting booths and reurning to the ballot boxes. Moreover, each voter must necessarily handle a plurality of ballots and frequently when marking the ballots is required to be in an unconvenient location and the votes are rendered illegal resulting from poor marking. Also, voters object to the opportunity offered election officers furtively to see how they have voted in placing the ballots in the ballot box.

Therefore, an important object of the invention is to provide a simple, light weight and convenient size, efficient, practical and durable voting machine which may be operated without technical skill on the part of voters and election officials and in the utilization of said invention ballots are concealed from all others except the electors who record their choice on the respective ballots and afterwards said ballots are deposited unfolded at random with other voted ballots, whereby the act of electors when voting is simplified to a great degree and the likelihood of failure of the electors to properly record his choice as between candidates or propositions is reduced to a minimum and subsequent sorting and counting of said ballots is performed quickly, efficiently and conveniently.

Other objects of the invention are to provide means whereby the deposited or cast ballots are automatically mixed in the ballot box in such a manner that the ballots cannot be subsequently selected for the purpose of determining the persons who marked or recorded the ballots; to provide means whereby after one elector has marked or recorded his ballot or voting paper, and manually operated the machine, this same or another elector cannot vote until the machine is set or unlocked by two representatives of the political parties involved in the election; to provide means whereby if the voter fails to follow through the operation of the machine it cannot be subsequently used except after the completion of the operation of the machine which will result in the ballot being deposited in the ballot box; to provide means whereby the ballot or voting paper, which may comprise cardboard connected in a continuous strip, may be advanced step by step to receive successively the vote of each individual elector or if unconnected may be presented one at a time for voting by an individual voter with means to prevent access to another ballot; to provide simple and efficient means adapted to automatically cut the marked ballots from said strip when said machine is operated to advance said strip to receive the vote of the next elector; to provide a more efficient and convenient method of checking the number of ballots voted at any time during the course of the election, and to eliminate indications as to how individual voters had cast their votes; to provide means whereby each voter causes his own ballot to be deposited in a locked ballot box, thereby assuring absolute secrecy and at the same time preventing any voter from voting more than one ballot; to provide means whereby ballots passed through the machine may be subsequently identified as having passed through a particular machine, thereby affording a further protection against fraud; to provide a machine which can be used in localities having laws requiring "rotating ballots" or such ballots as have names of candidates arranged differently on each subsequent ballot, or for convenient voting under election systems requiring voting by preference, number of choice, and which complies with laws of various States which permit voters to write the names of unnominated candidates, and the like; and to provide means whereby it is unnecessary to transport marked ballots from the election booth by the voters, thus avoiding confusion in the election quarters which results in rapid and efficient voting on the part of the voters.

The following detailed description refers to the foregoing and other objects of the invention which consists in certain novel features of construction and operation utilized in certain combination of parts.

The hereinafter drawings and general description is of the preferred design, although the same is subject to modifications without affecting the principles of the disclosure and I desire by inference to include variations.

In the drawings:

Fig. 6 is a rear elevational view of the invention with parts broken away;

Fig. 7 is a plan view of the ballot strip partly broken away;

Fig. 8 is a perspective view of the ballot box;

Fig. 9 is a plan view of the frame and gear mechanism;

Fig. 10 is a section taken on a line corresponding to 10—10 in Fig. 9;

Fig. 11 is an end elevational view of the crank partly broken away;

Fig. 12 is a perspective view of the frame, with parts broken away;

Fig. 13 is a section taken on a line corresponding to 13—13 in Fig. 9;

Fig. 14 is a side elevational view of the printing mechanism, with parts broken away;

Fig. 15 is a perspective view of the block;

Fig. 22 is a perspective view of the segment;

Fig. 23 is a perspective view of the lid, with parts broken away;

Fig. 24 is a perspective view of a lock;

Fig. 25 is a side elevational view of the same;

Fig. 26 is a section taken on a line corresponding to 26—26 in Fig. 25;

Fig. 27 is a section taken on a line corresponding to 27—27 in Fig. 25;

Fig. 28 is a side elevational view of a key;

Figure 1:
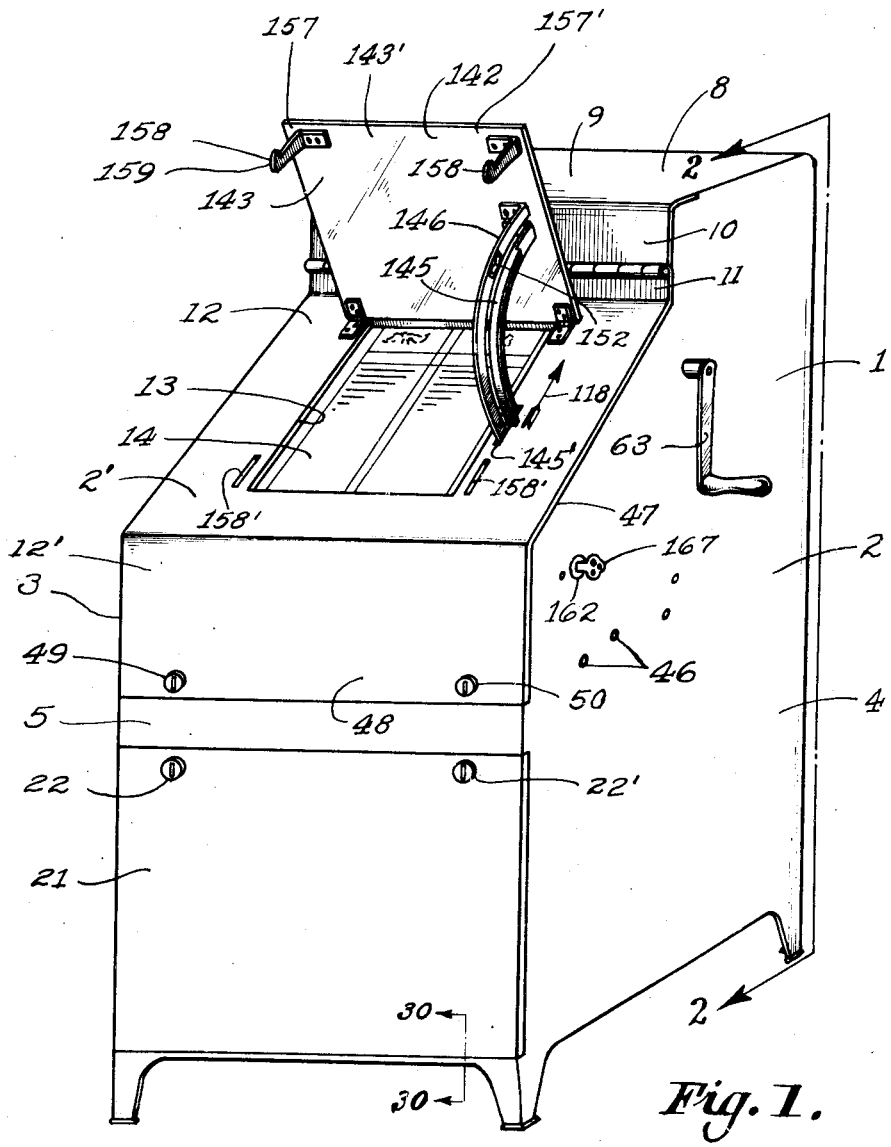
Fig. 1 is a perspective view of the invention.
Figure 30:
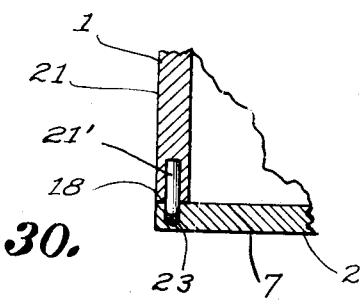
Fig. 30 is a section taken on a line corresponding to 30—30 on Fig. 1 with parts broken away.

In the preferred construction of the invention I provide the voting machine 1 which comprises the casing 2 having the vertical sides 3 and 4, vertical front and rear 5 and 6, horizontal bottom 7 and the top 8. The top 8 comprises the horizontal plate 9 having its downwardly turned edge 10 hingedly connected with the upturned edge 11 of the casing lid 2' comprising the downwardly and forwardly inclined plate 12 having integrally formed with its lower edge the vertical plate 12'. The plate 12 has therein the rectangular opening 13.

The ballot 14 is visible through the opening 13 and is supported by the writing board 15 whose side edges rest upon the tops of the side plates 16 and 16' of the head or frame 17. The board 15 acts as a support for the ballot 14 while it is being marked by a voter.

Referring to Fig. 1, in the front 5 of the casing 2 is the opening 18 through which the ballot box or drawer 19 is adapted to be slid and received in the space or compartment 20, of the casing, which receives the voted ballots, as hereinafter explained. The ballot box 19 is considerably larger than necessary to contain the ballots, so that sufficient space is provided therein to enable the ballots to fall at random and mix them in an undeterminable manner.

On the front board 21 are the locks 22 and 22' for utilization in locking the ballot box 19 in the compartment 20 to prevent any persons, other than those possessing keys to the locks, from removing the ballot box from the casing 2. The front board 21 has the lugs 21' integral with its bottom edge and received in the holes 23 of the casing. When positioning the front board 21 to close the opening 18 the lugs 21' are inserted in the holes 23 and then the top of the front board is moved inwardly thereby causing the locks 22 and 22' to automatically lock the front board in its position, since the locks are of the usual spring type.

Figure 5:
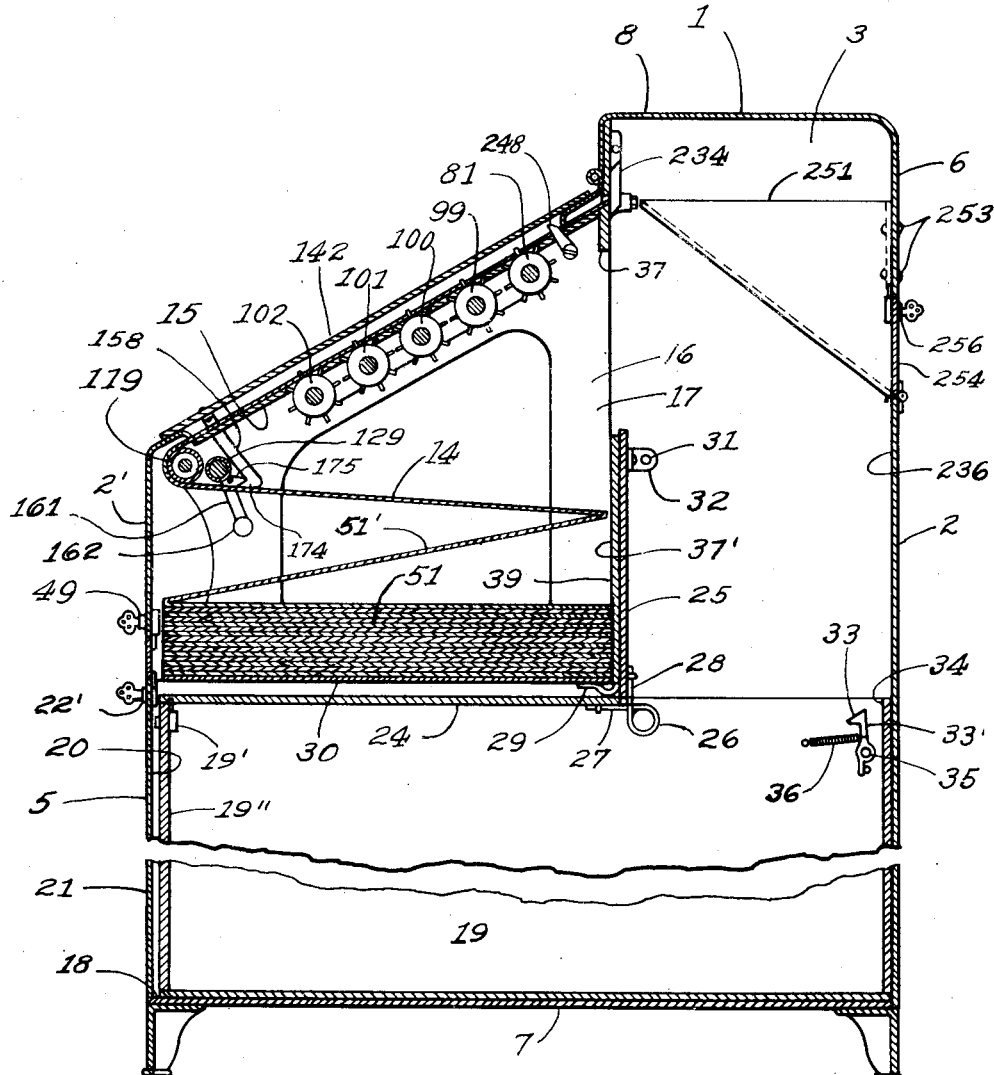
Fig. 5 is a section taken on a line corresponding to 5—5 in Fig. 3.

The top 24 of the ballot box has fixed thereto the lid 25 as by the torsion or coil springs 26 having its ends 27 and 28, respectively, fixed to the lower surface of the rear edge of the top 24, of the ballot box, and to the lower surface of the inner edge of the lid 25 whereby normally the torsion springs 26 are adapted to retain the lid in open position, as shown in Fig. 5. However, when the ballot box contains ballots and it is desired to remove it from the compartment 20 the keys, preferably possessed by representatives of two political parties, are utilized to unlock the locks 22 and 22' and the top of the front board 21 is manually forced outwardly and then lifted upwardly to remove the lugs 21' from the holes 23 in the casing. Then the ballot box may be manually forced forwardly and outwardly through the opening 18 in the casing 2, whereby the top surface of the lid 25 is caused to contact the lug 29, fixed to the lower surface of the bottom 30 of the head 17, thereby automatically closing the lid and the pins 31 of the downwardly extending L-shape lugs 32, suitably fixed to the lower surface of the outer edges of the lid 25, are caused to engage the heads 33 of the latches 33' which automatically locks the lid 25 in closed position since the latches 33' are pivotally connected with the respective sides of the ballot box thereby closing the opening 34 in the rear of the ballot box which cannot be opened or unlocked until it is received in possession of the proper political officials who have in their possession keys to unlock the locks 19' positioned in the door 19" which is hingedly connected with the front of the ballot box.

Before the ballot box 19 is placed into the compartment 20 the lid 25 must be in closed and locked in position, as by the pins 31, of the lugs 32, engaging the heads 33 of the latches 33' as shown in Fig. 5. After the ballot box is positioned in the casing and before the front board 21 is locked to close the opening 18, the lid is manually opened as by a person extending his arm into the compartment 20 and forcing the latches 33' rearwardly and from contact with the pins 31 whereby the torsion springs 26 force the lid 25 in open position as shown in Fig. 5. The latches 33' are pivoted to the sides of the box 19 as by the pins 35. The coil springs 36 are connected with the latches 33' and the sides of the ballot box 19 whereby the latches 33' are urged forwardly and normally retain the heads 33 in locking engagement with the pins 31.

Directly above the ballot box compartment 20 and in the forward portion of the casing 2 is the frame 17 which comprises the spaced apart angular side plates 16 and 16' having connected therewith the rear plates 37 and 37'. At the bottom edges of the plates 16 and 16' are the outwardly extending legs 38 integrally formed at the front and rear of its lower edges. The legs 38 are fixed, as by the bolts 38', to the bottom 30 of the frame 17. The bottom 30 forms the bottom of the unvoted ballot receiving compartment 39. The frame 17 is supported by the horizontal legs 40 and 41 of the angles 42 and 43 whose vertical legs 44 and 45, respectively, are secured as by bolts 46 to the inner surfaces of the sides 3 and 4 of the casing 2. The legs 40 and 41 and the bottom 30 are secured to the angles 42 and 43 as by the bolts 38'.

The casing lid 2' is of angular formation and its downwardly and forwardly inclined plate 12, when in closed position, is supported by the top edges 47 of the casing. The lower vertical plate 12', of the lid 2', is utilized to close the opening 48 in the front of the casing 2 which communicates with the unvoted ballot compartment 39. The plate 12' is provided with the locks 49 and 50, whereby when the stack 51 of the continuous strip or web 51' of the ballots 14, are placed in the compartment 39 the lid 2' may be locked in position to prevent any persons, except the possessors of the keys to the locks, from entering the compartment 39.

As shown in Fig. 12, in the side plates 16 and 16' are the holes 52 and 53 which rotatably receive the shaft 54 having the collar 55 secured onto its end 56, as by the screw 57. The collar 55 engages the outer surface of the side plate 16 to prevent movement of the shaft toward the side plate 16'. In the other end 58 of the shaft 54 is received the screw 59, as shown in Fig. 10, having the shoulder 60, integrally formed adjacent its head 61, around which is received the inner end 62 of the hand contact crank 63. The key 64 is received in the key holes 65 and 66 in the crank 63 and the bushing 67, whereby rotatable movement of the hand contact crank 63 is adapted to rotate the bushing 67. Fixed to the bushing 67 is the ratchet retainer plate or pendant 68 for purposes fully hereinafter explained. The ratchet 69 is fixed to the shaft 54 as by the pin 70 and contacts the plate 68. Adjacent the boss 71, integrally formed with the outer side of the side plate 16', is the main driving gear 72 which is fixed to the shaft 54 as by the pin 73. Fixed to the shaft 54 and intermediate the ratchet 69 and the gear 72 is the sprocket wheel 74.

Figure 2:
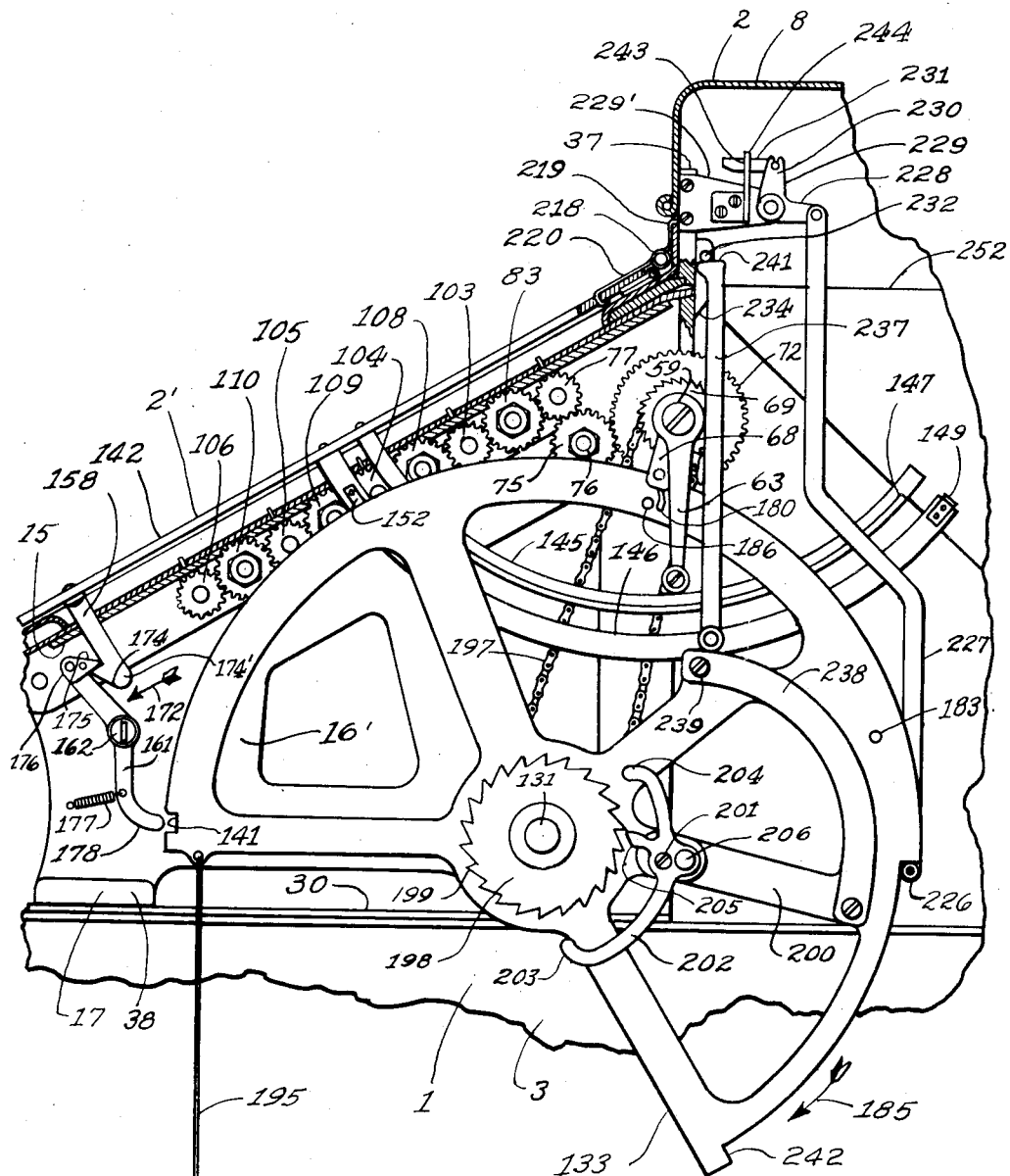
Fig. 2 is a section taken on a line corresponding to 2—2 in Fig. 1 and with parts removed.

Meshing with the gear 72 is the idler gear 75, as shown in Fig. 2, which is mounted on the stud 76 fixed to the outer side of the side plate 16'. The gear 75 meshes with the gear 77 fixed to the shaft 78 which extends transversely of the frame 17 and is rotatably mounted in the holes 79 and 80 in the side plates 16 and 16'. Spaced from the inner surfaces of the side plates 16 and 16' are the pin or sprocket wheels 81 and 82 suitably fixed to the shaft 78. Meshing with the gear 77 is the idler gear 83 which is mounted on the screw bolt 84 having its inner end 85 threaded in the hole 86 in the side plate 16'.

Figures 3, 4:
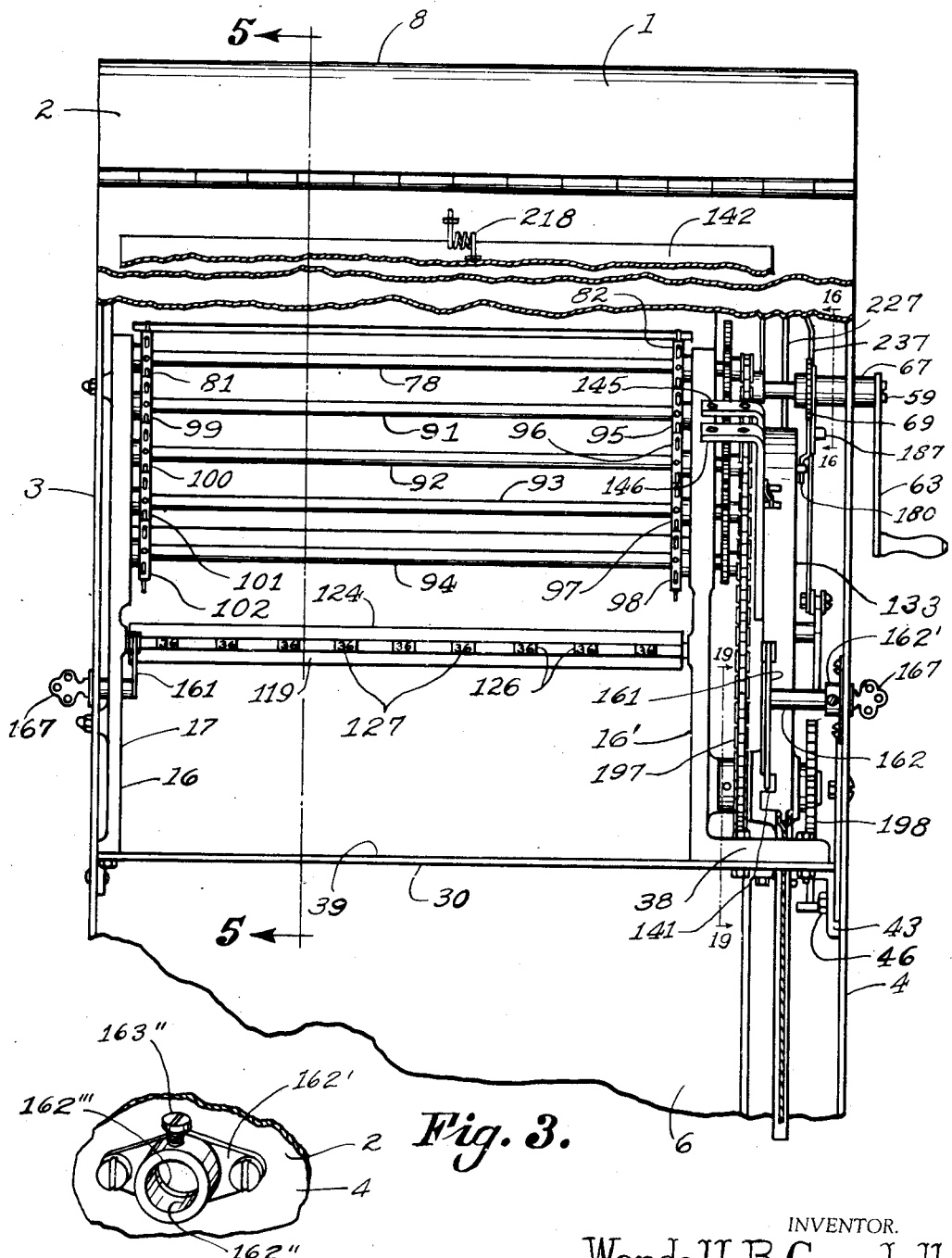
Fig. 3 is a plan view of the invention with parts broken away and parts removed.
Fig. 4 is a perspective view of the lock support and casing with parts broken away.

The holes 87, 88, 89 and 90, in the side plate 16', receive the ends 91', 92', 93' and 94' of the shafts 91, 92, 93 and 94 whose other ends are mounted in the side plate 16. The pin wheels 95, 96, 97 and 98, shown in Fig. 3, are spaced from the inner surfaces of the side plate 16' and are mounted upon the ends 91', 92', 93' and 94' of the shafts 91, 92, 93 and 94 which have mounted on their other ends the pin wheels 99, 100, 101, and 102 positioned adjacent the inner surface of the side plate 16. On the outer ends of each of the shafts 91, 92, 93 and 94 are the gears 103, 104, 105 and 106 which mesh with the idler gears 107, 108, 109 and 110 which are mounted on the studs 111, 112 and 113 received in the side plate 16', whereby rotation of the hand contact crank 63 may, under the circumstances hereinafter fully explained, cause rotation of the gears 77, 103, 104, 105 and 106 which in turn cause rotation of the shafts 78, 91, 92, 93 and 94 for the purpose of causing rotation of the pin wheels 81 and 82, 99 and 95, 100 and 96, 101 and 97 and 102 and 98 whose pins 114, extend outwardly and are adapted to be received through the perforations or holes 115 in the outer edges 116 and 117 of the ballot 14 for the purpose of causing movement of the ballot on the writing board 15 in the direction indicated by the arrow 118 in Fig. 1.

The ballots 14 are in web formation and connected with each other, it being apparent that the web may be suitably mounted upon a roll or as herein shown assembled in the stack 51 so that when the hand contact crank 63 is rotated and the pins 114 of the pin wheels enter the perforations 115 in the outer edges 116 and 117 of the ballot 14, positioned on the writing board 15, the latter mentioned ballot moves rearwardly and upwardly on the inclined surface of the writing board and automatically pulls the web in contact with the printing mechanism 119, hereinafter fully described, whereby as the ballot 14 on the writing board 15 moves rearwardly other ballots from the stack 51 are caused to move forwardly whereby as one voted ballot is being removed from the writing board 15, as by manual operation of the crank 63, another unvoted ballot is being moved rearwardly to take the position on the writing board just previously occupied by the voted ballot.

Rotatably mounted in the upper edges of the ends 120 and 120' of the side plates 16 and 16' are the shafts 121 and 122 of the printing mechanism 119 shown in Figs. 13, 14 and 3. Suitably secured to the shaft 121 is the tubular cylinder 123 having thereon the covering 124 which has in its outer peripheral surface the spaced apart recesses 125 having suitably secured therein the blocks 126 each having on its outer face the indication or type 127 which is adapted to contact the lower surface 14' of the ballot 14 when the hand contact crank 63 is rotated for the purpose of moving the web of ballots toward the rear of the casing 2.

Suitably fixed to the shaft 122 is the hollow cylindrical roller 128 having thereon the pervious covering 129 which is adapted to absorb ink, received in the roller 128, whereby rotation of the shaft 121, caused by contact of the covering 124 with the lower surface of the ballot 14, causes rotation of the cylinder 123 and shaft 121 whereby the type 127, on the outer surface of the block 126, prints the lower surface of the ballot 14 and the type 127 contacts the pervious covering 129 of the roller 128 and absorbs a sufficient quantity of ink to cause a plurality of characters 130 to be printed in aligned rows on the back or lower surface 14' of the ballot 14 while the voted ballot is moving rearwardly on the writing board 15. The purpose of the characters or indications 130 being printed on the back or lower side 14' of the ballots 14, as the same pass rearwardly, is that at any future time, after the ballots are removed from the ballot box 19, in the casing 2 of the voting machine 1, reference to the characters or indications 130 printed on the back or lower surface of the ballots clearly indicates from which voting machine the ballots were removed, since each voting machine has installed on its cylinder 123 different type 127.

Rotatably mounted on the stub shaft 131, which is secured in the hole 132 in the side plate 16', is the wheel or segment 133 which has on its inner edge the flange 134 in which are formed the notches 135, 136 and 137. The notches 135 and 136 are adjacent the end 138 of the flange and the notch 137 is adjacent the end 139 of the flange. Adjacent the notch 137 is the recess 140 formed in the inner surface of the flange. In the outer peripheral surface of the arc is the notch 141. The notch 136, as shown in Fig. 22, is less in width than the width of the notch 135.

Hingedly connected with the plate 12 of the casing top 2' is the lid 142 having fixed to its lower side 143 and adjacent its edge 144, the spaced apart curved upper and lower bars 145 and 146 which are slidably received in the slots 145' in the plate 12 of the casing lid 2'. Integrally formed with the outer lower edge of the curved bar 145 is the flange 147. The outer end 148 of the bar 146 has fixed thereto the spring 149, as by the rivets 150. The spring is bent at right angles to the bar and extends in the same direction as the flange 147 is extended on the bar 145 and is adapted to contact the inner edge of the rim of the segment 133, when the segment is rotated at the time the bar 146 is in an uppermost position. Fixed to the lower curved bar 146, adjacent its end 151 is the curved spring 152 having its end 153 fixed to the bar as by the rivet 155. The other end 154 is slidable on the bar 146 since the rivet 155 at the end 154, of the spring 152, is slidable in an enlarged hole in the spring 152. For this reason the head of the rivet 155 at the end 154 is slightly larger than the head of the rivet 155 at the end 153 of the spring. The intermediate portion 156 of the spring is spaced from the bar 146.

Fixed to the lower side 143 and adjacent the lower edge 143' and adjacent the outer edges 157 and 157' of the lid 142 are the downwardly extending latches 158 shown in Figs. 1, 2 and 5 whose heads 159 are adapted to engage the heads 160 of the rocker arm 161 mounted on the locks 162 respectively fixed in the brackets 162' having the holes 162" which are aligned with the holes 162'". Each lock 162 comprises the cylinder 163 having the closed end 164 and the open end 165. The end 164 has the key hole 166 therein for receiving the key 167. The cylinder 163 has the stud 163' in its end 165 and has the lug 168 fixed in its inner end. The other end of the stud 163' has fixed thereto the rocker arm 161. The lug 169, integral with the cylinder 163, extends inwardly of the cylinder. The relative sizes and locations of the lugs 168 and 169 require a special key 167 having the notch 170 properly positioned and of proper size to receive the lug 169 so that the key can be manually turned for contacting the edge 171 of the key with the lug 168 to cause rotation of the arm 161 in the direction indicated by the arrow 172, shown in Fig. 2, which is rotatably mounted in the groove 173 of the cylinder 163. The pin 168', in the lug 163', extends outwardly through the slot 168" and retains the lug 163' in rotatable predetermined position in the cylinder. The screw 163" retains the cylinder 163 in fixed position.

When the lid 142 is manually moved downwardly and in closed position, as shown in Fig. 2, the latches 158 pass through the slots 153' in the plate 12, of the casing lid 2', and the inclined surface 174 of the head 174' of the latch 158 is adapted to contact the inclined surface 175 of the head 176 of the rocker arm 161. The latches 158 and the rocker arms 161 are formed from spring steel, or suitable resilient material, whereby when the inclined surface 174, of the head 174', contacts the inclined surface 175, of the head 176, the material from which the latches 158 and the arms 161 are formed will spring or give sufficiently to allow the heads 174' to slide over the head 176 and permit the heads 174 to lock on the heads 176, as shown in Fig. 2. The coil spring 177, fixed to the lower curved end 178, of the arm 161, and to the adjacent side plate 16', is adapted to cause the tail 178 of the rocker arm to move outwardly after the key 167 is operated. The lower flat surface of the head 176 engages the head 174' of the latch 158 whereby upward movement of the lid 142 is prevented and the ballot 14 on the board 15 is concealed and inaccessible until the keys which fit the locks 162 are inserted into the locks and turned for the purpose of causing the heads 176 of the rocker arms to move forwardly in the direction indicated by the arrow 172 thereby disengaging the lower flat surfaces of the heads 176 with the upper flat surfaces of the heads 174' whereby upward movement of the lid 142 is permitted.

The purpose of providing the locks 162 is that each lock may be adapted to be opened or turned by different kinds of keys 167, whereby one key may be possessed by a representative of one political party and the other key may be possessed by a representative of the other political party so that under no circumstances may the lid 142 be raised to permit voting on the ballot 14 positioned on the board 15 until both keys are inserted in both of the locks and turned for the purpose of disengaging the heads 176 of the rocker arms 162 from the heads 174' of the latches 158.

When the key 167 is inserted in the lock 162 shown in Figs. 24, 25 and 26, in the side 4 of the casing 2, for the purpose of removing the head 176 from contact with the head 174', of the latch 158, the lower curved end 178 of the rocker arm 161 is received in the notch 141 of the arc 133 which prevents rotation of the arc, for purposes fully hereinafter explained.

Figure 16:
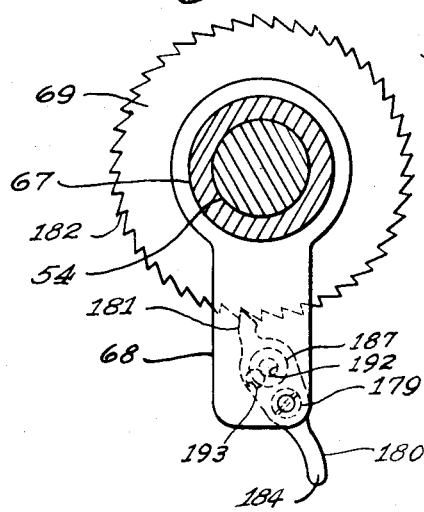
Fig. 16 is a section taken on a line corresponding to 16—16 in Fig. 3.
Figure 17:
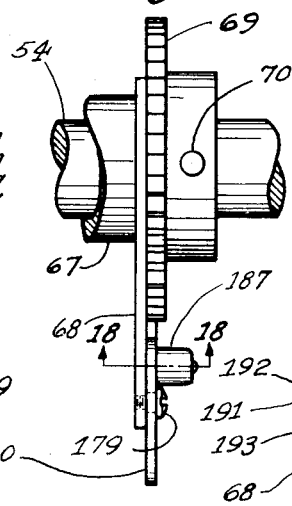
Fig. 17 is a side elevational view of the mechanism shown in Fig. 16, with parts broken away.

The pendant 68, fixed to the bushing 67, has in its lower end the screw 179 on which is pivotally mounted the pawl member or rocker arm 180 whose end or pawl 181, when the rocker arm is positioned as shown in Fig. 16, is adapted to engage the teeth 182 on the ratchet 69 so that when the hand contact crank 63 is rotated the ratchet 69 is caused to rotate thereby rotating the shaft 54 which in turn rotates the sprocket gear 74 and the main driving gear 72. However, it is desirable to prevent movement of the ballot 14, on the writing board 15, by rotation of the hand contact crank 63 when the lid 142 is in open position for the reason that if the ballot could be moved rearwardly, by rotation of the hand contact crank 63, when the lid is in open position, a voter could vote the ballot exposed through the opening 13 in the plate 12 and then by turning the crank 63 position another ballot on the writing board to be voted. Therefore, under certain circumstances, hereinafter fully explained, the pin 183 on the outer surface of the segment 133 is adapted to contact the tail or lower end 184 of the rocker arm 180 and cause the pawl 181 of the rocker arm to be removed from contact with the teeth 182 of the ratchet 69, whereby rotation of the hand contact crank 63 simply rotates the bushing 67 which in turn rotates the pendant 68 without imparting rotary movement to the ratchet wheel 69 or the sprocket wheel 74.

Figure 29:
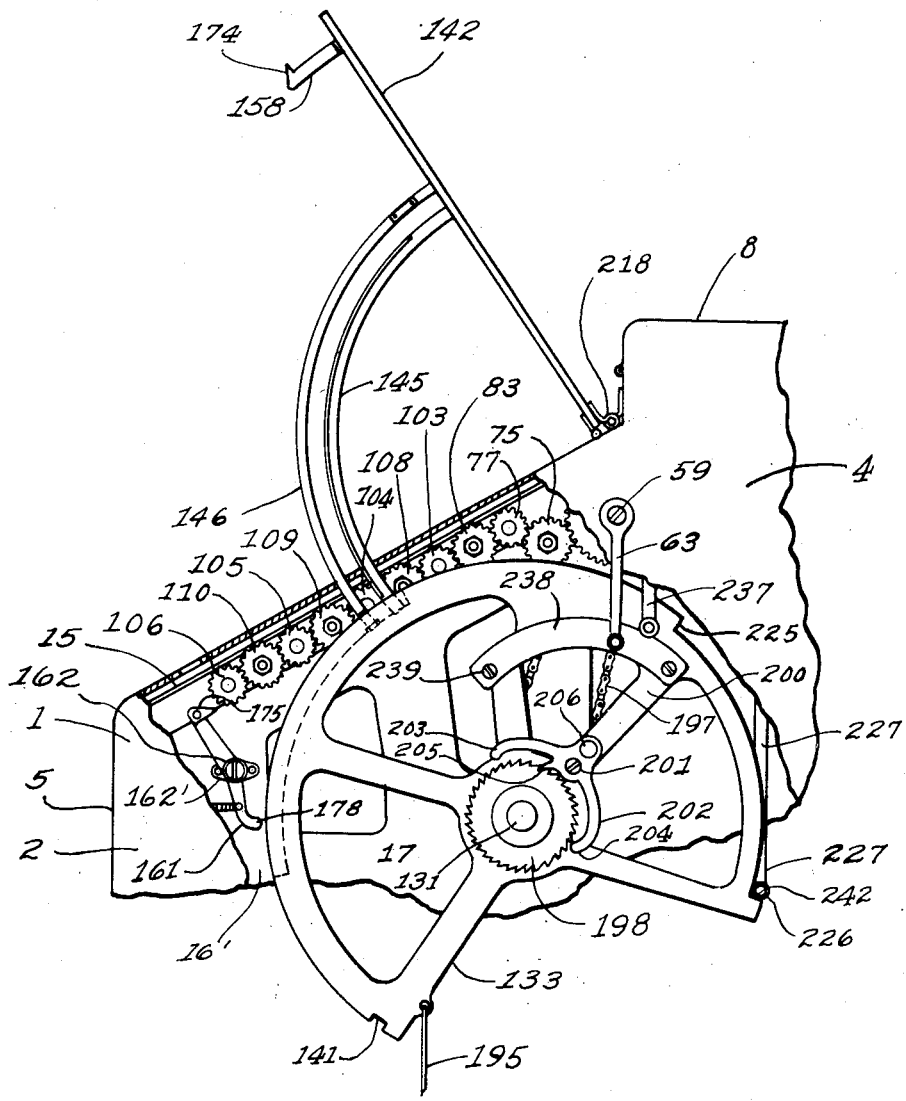
Fig. 29 is a side elevational view of the invention with parts broken away and with parts removed.

When the segment 133 returns to the position shown in Fig. 2, after closing the lid, the pin 186 is engaged by the ratchet 180 until the mechanism automatically takes the position shown in Fig. 29 when the ratchet 180 is operated by contact with the pin 183. Also, the flange 147 of the curved bar 145 engages the shoulder 134 simultaneously before final release of the spring 149 from the notch or slot 140, whereby it is impossible for the operator to disengage the spring 149 from the notch 140 until the flange 147 is received in the slot 137.

When the segment 133 moves in the direction indicated by the arrow 185 the pin 186, extending outwardly from the outer surface of the segment 133, engages the tail or lower end 184 of the rocker arm 180 thereby causing the pawl 181 to disengage the teeth 182 of the ratchet 69, whereby rotary movement cannot be imparted to the gear 72 and the sprocket wheel 74 when the hand contact crank 63 is rotated.

For the purpose of providing positive position of the rocker arm 180 in both positions herein previously explained, the retainer 187 is provided which comprises the cup 187 fixed to the rocker arm 180 and has extending therethrough the pin 188 having received therearound and within the cup the coil spring 189 whose outer end engages the inner surface of the cup and the other end of the coil spring engages the collar 190, fixed to the pin and received in the cup, whereby at all times the coil spring 189 exerts inward force against the collar thereby forcing the inner end 191 of the pin in contact with the pendant 68. The inner end of the pin is adapted to be received in the recess 192, in the lower end of the pendant 68 when the rocker arm is in the position shown in Fig. 18 and when the tail or lower end 184 of the rocker arm 180 is contacted by the pin 183, on the segment 133 to disengage the pawl 181 from engagement with the teeth 182, of the ratchet 69, the inner end 191 of the pin 188 is forced outwardly from the depression 192 thereby compressing the coil spring 189 during the period the end 191 of the pin slides over the surface of the pendant 68. The inner end 191 of the pin travels into the depression 193 and the coil spring 189 retains the inner end 191 in the depression to prevent rotary or pivotal movement of the rocker arm 180.

When the segment 133 is rotated to the position shown in Fig. 2 it is desirable that the weight 194 forces the segment to rotate in a direction opposite to the direction indicated by the arrow 185. The weight is secured to the lower end of the string 195 whose upper end is secured to the rim of the segment 133 and adjacent the notch 141.

Fixed to the stub shaft 131 and intermediate the segment and the side plate 16' is the sprocket wheel 196 having thereon the chain 197 which also meshes with the sprocket wheel 74. Fixed to the shaft 131 and intermediate the segment 133 and the side 4 of the casing 2 is the ratchet wheel 198 having the teeth 199 thereon.

When the segment 133 is rotated by the weight 194, it is desirable that the sprocket chain 197, which meshes with the sprocket wheels 74 and 196, does not cause rotation of the sprocket wheel 74. When, however, the weight 194 has forced the segment to rotate it is desirable that rotation of the sprocket wheel 74 causes rotation of the sprocket wheel 196 and the segment 133. Pivotally mounted on the spoke 200 of the segment 133, as by the screw 201, is the rocker arm or bell crank 202 having the inwardly curved ends 203 and 204. Integrally formed on the inner edge of the bell crank and intermediate the curved ends 203 and 204 is the pawl 205 which may be disengaged from the teeth 199 of the ratchet 198 to permit rotation of the segment 133 without imparting rotative movement to the sprocket wheel 196. When by means, hereinafter fully explained, the pawl 205 is caused to engage the teeth 199 of the ratchet 198, rotary movement of the sprocket wheel 74 imparts rotative movement to the segment 133 through the chain 197, sprocket wheel 196, shaft 131, ratchet 198 and rocker arm 202.

Figure 18:
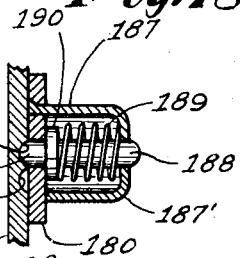
Fig. 18 is a section taken on a line corresponding to 18—18 in Fig. 17.
Figures 20, 21:
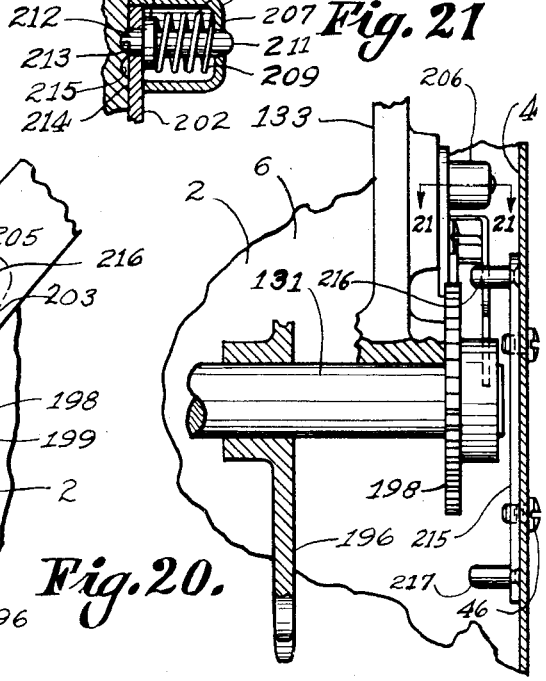
Fig. 20 is a side view of Fig. 19 with parts broken away.
Fig. 21 is a section taken on a line corresponding to 21—21 in Fig. 20.

In order that the rocker arm 202 is retained in two positive positions, namely with the pawl 205 in engagement with the teeth 199 of the ratchet 198, as shown in Fig. 21 and with the pawl 205 out of contact with the teeth 199 of the ratchet 198, the retainer 206 is provided which is similar to the retainer 187 shown in Fig. 18.

The retainer 206 comprises the cup 207 fixed to the central portion of the rocker arm 202 and has the coil spring 208 therein having its outer end 209 contacting the cup and its other end contacts the collar 210 which contacts the arm 202, and is fixed to the pin 211 whose outer end projects through a hole in the outer end of the cup 207. Its inner end 212 passes through the arm 202 and contacts the segment 133. When the rocker arm 202 pivots on the pin 201 from one position to the other the inner end 212 of the pin 211 engages the segment 133. When the rocker arm 202 is in the position shown in Fig. 21 the inner end 212 of the pin is received in the depression 213 which retains the rocker arm 202 in fixed position. When the rocker arm 202 is moved to its other positive position the inner end 212 of the pin 211 is received in the depression 214 whereby the rocker arm 202 is retained in this positive position, until sufficient force is exerted to cause the pin 211 to be removed from the depression 214.

Figure 19:
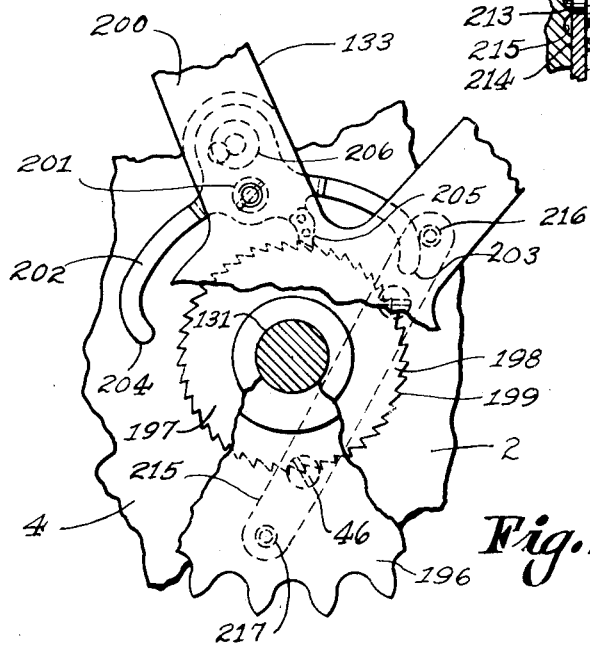
Fig. 19 is a section taken on a line corresponding to 19—19 in Fig. 3, with parts broken away and parts removed.

Fixed to the inner surface of the side 4 of the casing 2 is the plate 215 having integrally formed therewith the spaced apart and inwardly projecting pins 216 and 217 so arranged and positioned that rotation of the segment 133 in predetermined direction causes the pin 216 to engage the outer surface of the curved end 203 of the rocker arm 202 for the purpose of forcing the rocker arm 202 in the position shown in Fig. 19 and the pawl 205 is moved in contact and engagement with the teeth 199 of the ratchet 198. Rotatable movement of the segment 133 in a predetermined direction causes the pin 217 to engage the outer curved end 204 of the rocker arm 202, thereby causing the rocker arm to pivot in a direction which causes the pawl 205 to disengage the teeth 199 of the ratchet 198.

The coil spring 218, having its ends 219 and 220, respectively, fixed to the upper surface of the lid 142 and the upturned edge 11, of the casing lid 2', automatically urges the lid 142 to the open position shown in Figs. 1 and 29, for purposes hereinafter fully explained.

The mechanism for cutting the ballots, shown in Figs. 2 and 6, comprises the shoulder 225, formed on the rim of the segment 133 which, under circumstances hereinafter described, is adapted to engage the lower end 226 of the vertical connecting rod 227 which is pivotally connected with the leg 228 of the bell crank 229 which is pivotally mounted on the bracket 229' fixed to the bar 37. The upper end of the vertical leg 230 is suitably fixed to the rear end of the horizontal supporting finger 231 which, as shown in Fig. 6, is adapted to support the stud 232 fixed to the end 233 of the knife 234 which has its end 235 pivotally connected with the bar 37. The passage 236, clearly shown in Fig. 5, is positioned below the knife 234 and the groove 222 and communicates with the compartment 20, in which the ballot box 19 is received.

The vertical push rod 237 is positioned in vertical alignment with the curved cam 238 which is secured to the segment 133 as by the screws 239. The cam 238 is eccentric of the hub 240 of the segment 133. The upper end 241, of the push rod 237, is in alignment with the pin or stud 232 fixed in the end 233 of the knife 234.

Formed on the segment 133 is the lug 242 spaced from the shoulder 225.

The finger 231 slides in the slot (not shown) in the upper end 243 of the bracket 244 which is fixed to the bracket 229'.

The ballot 14 has integrally formed with its edges 116 and 117 the stubs 245 and 246 which have imprinted thereon the characters 247. The purpose of the characters 247 is to indicate the number of ballots voted as by reference to the character 247 imprinted on the last stubs cut from the strip 51'. The knives 248 and 249 extend upwardly through the slots 250 in the writing board 15. The lower ends of the knives are suitably attached to the inner surfaces of the side plates 16 and 16'. The vertical knives 248 and 249 are positioned in vertical alignment with the inner edges of the stubs 245 and 246, respectively.

For the purpose of receiving the stubs 245 and 246 after the stubs are cut from the strip 51', the boxes 251 and 252 are fixed to the rear 6, of the casing 2, as by the rivets 253 and are positioned in vertical alignment and below the stubs whereby the stubs are adapted to fall by gravitation into the boxes 251 and 252.

Hingedly connected with the rear 6, of the casing 2, are the doors 254 and 255 which are provided with usual locks 256 and 257, respectively, intended to be utilized for the purpose of locking the doors 254 and 255 in closed position. When the boxes 251 and 252 contain stubs 245 and 246, the stubs may be removed from the boxes as by manually unlocking the locks 256 and 257 to permit access to the boxes through the openings or doorways 258 and 259 in the rear of the casing.

The operation of the invention is as follows:

Assume that the casing lid 2' is opened and a stack 51 of the continuous strip or web 51' of the ballots 14 is positioned in the compartment 39, after which the first or top ballot is manually passed over the print roll 119 and its perforated edges are received by the pins of the pin wheels 81, 99, 100, 101 and 102 and that the outer or upper edge of the top ballot is in contact with the front side of the knife 234. Then the lid 2' is locked in closed position and the lid 142 is manually retained in open position as shown in Fig. 1. The machine now is ready to use for voting and the first voter uses the ballot 14 positioned adjacent the opening 13 for voting purposes. Or, if preferred, the lid 142 is closed and then the hand contact handle 63 is rotated to cause the first ballot, positioned adjacent the knife 234, pass through the groove 222 and the knife 234 is permitted to fall and cut off the first or blank ballot. Then the machine is ready to vote by the first voter, the first or test ballot which may be suitably so marked for record purposes being deposited in the ballot box by the above mentioned action. Or, if preferable, the tail 178 may be retained in the notch 141, by suitable manually operative means, as by use of the key 167, for the purpose of retaining the segment 133 in stationary position, as shown in Fig. 2, during the time that the lid 2' is in open position and while the first ballot is being placed in proper position at the opening 13, after which the lid 2' and the lid 142 may be closed and afterward the spring 177 may be permitted to pull or urge the tail 178 from the notch 141.

In either of the above three mentioned methods of setting the machine for use the subsequent voters vote consecutively and only in the second mentioned method is a test ballot, or one not voted by an authorized voter, necessarily deposited in the ballot box.

When the first voter arrives for the purpose of voting the two keys 167, possessed by two representatives of two different political parties, are inserted into the locks 162 and turned whereby the heads 176 of the rocker arms 161 are removed from contact with the heads 174', of the latches 158, and the tail or lower end 178 of the rocker arm 161, adjacent the side 4 of the casing 2, is received in the notch 141 in the segment 133. The coil spring 218, having its ends 219 and 220 fixed to the upper surface of the lid 142 and the upturned edge 11 of the casing lid 2', causes the lid 142 to automatically open to the position shown in Figs. 1 and 29. The flange 147 received in the notch 136 in the segment 133 prevents rotary movement of the segment 133 during the period of time that the lid 142 is moving from closed position shown in Fig. 5, to the open position shown in Figs. 1 and 29. After the keys 167 are utilized to remove the heads of the rocker arms 161 from contact with the heads of the latches 158 and the segment 133 starts to rotate, while the lid 142 is in open position the tail of the rocker arm 161 contacts the outer edge of the rim of the segment 133. However, when the segment is in any other position from that shown in Fig. 2 and the lid 142 is closed, said lid cannot be unlocked for the reason that the tail 178 contacts the outer rim of the segment which prevents unlocking the head of the rocker arm 161, adjacent the side 4 of the casing, from the head of the latch 158 at any time that the lid 142 may be afterward closed and before the segment 133 is rotated to its foremost position, as shown in Fig. 2. Simultaneously when the lid begins to open the spring 152 is removed from the notch 135 in the flange 134 of the segment 133, and the flange 147 of the bar 145 is received in the notch 136 of the segment whereby, during the upward movement of the lid 142 the flange 147 prevents the force of the weight 194 from causing the segment to rotate. An instant before the lid 142 is in its uppermost position, as shown in Fig. 29, the flange 147 passes from the notch 136 in the segment 133 and the arc is permitted to rotate in a forward direction opposite to the direction indicated by the arrow 185 caused by force of the weight 194. The spring 149, fixed to the end 148 of the lower curved bar 146, enters the recess 140, after the segment has rotated to the end of its stroke and engages the shoulder 221 thereby preventing rotatable movement of the segment 133 while the lid is in open position, as shown in Fig. 29. The spring 149 contacts the inner peripheral surface of the flange 134 of the segment 133 as the weight 194 rotates the segment until the arc rotates to a position permitting the curved spring 149 to enter the recess 140, whereby manual rotation of the segment is prevented until the lid 142 is closed after the voter votes the ballot 14 positioned on the writing board 15.

During the end of the forward travel of the segment 133 in a direction opposite to the arrow 185, the outwardly extending pin 183 contacts the tail or lower end 184 of the rocker arm 180, thereby causing the end 191 of the pin 188 to move from the depression 193 and into the depression 192, and the end or pawl 181 engages the teeth 182 of the ratchet 69 whereby rotation of the manual hand contact crank 63 is adapted to rotate the sprocket wheel 74 and the gear 72. Simultaneously at the end of the forward stroke or movement of the segment 133, the end 203 of the rocker arm 202 contacts the pin 216 whereby the rocker arm 202 is caused to pivot into the position shown in Fig. 19 and the pawl 205 is caused to engage the teeth 199 of the ratchet 198 and movement of the sprocket wheel 74, caused by rotation of the hand contact crank 63, causes rotary movement of the segment 133.

After the voter has indicated his choice on the ballot 14, in the opening 13, he manually closes the lid 142, thereby removing the spring 149 from the notch 140, in the inner section 134 of the segment 133. During the downward course of the lid, the segment 133 is held in the position shown in Fig. 2 because the shoulder 145 of the curved bar 147, attached to the lid, is passing through the notch 137 of the inner section 134 of the segment 133, this engagement taking place simultaneously with the releasing of the spring 149 from the notch 140. When the lid has completed its downward course the latch 158 engages the head 176 of the rocker arm 161, whereby opening of the lid is prevented until the keys 167 are inserted into the locks 166 and turned to cause the heads 175 of the rocker arms 161 to disengage the heads 174' of the latches 158. The voter then may rotate the hand contact crank 63 for the purpose of causing rotation of the pin wheels 81, 82, 95, 96, 97, 98, 99, 100, 101 and 102 whose pins 114 cause the voted ballot 14 to slide upwardly on the writing board 15 and through the space groove 222 in the upper rear plate or shearing bar 37 which comprises the integral upper and lower plates 223 and 224.

After the ballot 14 has passed through the groove 222 the shoulder 225 of the rim of the segment 133 engages the lower end 226 of the connecting rod 227 thereby causing the leg 228 of the bell crank 229 (mounted on the bracket 229' which is fixed to the bar 37) to move downwardly and the vertical leg 230, of the bell crank 229, to move rearwardly which removes the supporting finger 231 from beneath the pin or stud 232, which is fixed to the end 233 of the knife 234, thereby permitting the knife 234, (which has its end 235 pivotally connected with the bar 37) to fall downwardly and sever the voted ballot from the strip of ballots, whereby the voted ballot is permitted to fall through the passage 236 and into the ballot box 19.

During the time that the voter turns the hand contact crank 63, for the purpose of causing the ballot 14 to move upwardly on the writing board 15 and through the groove 222, the sprocket wheel 74 is rotated and as by engagement of the sprocket chain 197 the sprocket wheel 196 is rotated on the shaft 131. When the segment 133 has been rotated a predetermined distance the outwardly extending pin or lug 186 contacts the lower end or tail 184 of the rocker arm 180 thereby causing the rocker arm to pivot on the screw 179 from the position shown in Fig. 2 and with the pawl 181 out of engagement with the teeth 182 of the ratchet 69, whereby rotatable movement of the hand contact crank 63 cannot impart rotary movement to the sprocket wheel 74 or the gear 72 which prevents the voter from feeding through the groove 222 more than one ballot, or positioning a fresh and unvoted ballot on the writing board 15.

This last described action is regulated to be simultaneous with the arrival of the lower end of the ballot 14 at a point directly under the knife 234 and at the moment that the knife 234 has been operated as above described to cut off the ballot from the strip 51', at the same time, the spring 152 on the curved bar 146 has entered the slot 135 of the inner rim 134 of the segment 133 thereby stopping and holding in position the segment 133 until the lid is again opened.

At the same time, the slot 141, in the segment 133, has arrived opposite the tail of the rocker arm 161, permitting movement of the rocker arm 161 sufficiently to allow movement of the heads 175 with respect to the heads 174, to allow unlocking of the lid 142 as by insertion of the keys 167, in the locks 162 as above described.

This is the only point, in the operation of the machine, where it is possible to open the lid 142 at which point the segment 133 is held in position (until the keys 167 are inserted and turned) by the action of the spring 152 in the slot 135 of the inner rim 134 of the segment 133. While the spring 152 contacts the inner surface of the inner rim 134, of the segment 133, the segment travels in the direction indicated by the arrow 185 as above described, and the slot 136 must pass over the spring 152 since the slot 136 is too narrow to allow the entrance of the spring 152.

Simultaneously during the rotation of the crank 63, for the purpose of positioning an unvoted ballot on the writing board 15, after the lid 142 is closed, and after the segment 133 has traveled a predetermined distance, the pin 217 contacts the end 204 of the rocker arm 202 thereby causing the pawl 205 to move from the position shown in Fig. 19 out of engagement with the teeth 199 of the ratchet 198 which permits the segment 133 to be returned into the position shown in Fig. 2, after the lid 142 is opened, without causing rotation of the sprocket wheel 74 through the sprocket wheel 196. The purpose of preventing rotation of the sprocket 74 during the return movement of the segment 133 is to prevent movement of the ballot 14 through rotation of the main driving gear 72, the gears 75, 77, 103, 104, 105 and 106, and the pin wheels 81, 82, 95, 96, 97, 98, 99, 100, 101 and 102.

The reasons for the above mentioned operations are that once the lid is closed, access to the voted ballot 14 is impossible until the lid 142 is opened, as described above, and by the above mentioned operations, opening of the lid 142 is possible at no other time than when a fresh and unvoted ballot 14 is under the lid 142 and at the opening 13.

Opening of the lid 142 can be accomplished only by the simultaneous action of two parties holding the keys 167 which should preferably be entrusted to representives of different political parties. When the voter has indicated his preference on the ballot 14 and has closed the lid 142, the lid cannot be again opened until the crank 63 of the machine has been operated to deposit the voted ballot 14 into the ballot box 19, thus preventing inspection of the voted ballot by anyone. The voted ballot cannot be moved from the votable location, until the lid 142 is completely closed, thus preventing the voter or others having access to next unvoted ballot adjacent the voted ballot. If the voter should fail to close the lid 142 after voting, and should leave the machine, the crank 63 cannot be turned, and another unvoted ballot placed at the opening 13 until the lid 142 is closed and the voted ballot is deposited in the ballot box by rotation of the crank 63, as no unvoted ballots can be moved into votable position by any other action. The object of this operation is to prevent destruction or loss of a ballot although a voter does not complete the action of the machine by closing the lid 142 and turning the crank 63. This combination of operations prevents illegal voting of more than one ballot; identifies the ballot as having passed through the particular machine 1; obscures the voted ballot from observation; preserves secrecy; prevents the use of the machine more than one time, all of which is under the control of the election officers holding the keys 167.

After the key 167 is inserted into the key hole 166 and the arm 161 is moved from engagement with the latch 158, the lid 142 is permitted to open and subsequent action of the segment 133, (previously explained) caused by force of the weight 194 causes the lower end of the push rod 237 to engage the outer peripheral surface of the cam 238, secured to the segment by the screw 239, and eccentric of the hub 240 of the segment. Rotation of the segment 133 caused upward movement of the push rod 237 whose upper end 241 contacts the pin 232 in the end 233 of the knife 234 whereby the knife is forced upwardly. Immediately thereafter the lower end of the connecting rod 227 is contacted by the lug 242 integral with the rim of the segment and the rod 227 forces the leg 228 of the bell crank 229 upwardly, whereby the leg 230 moves forwardly and causes the finger 231 to slide under the stud 232 in the end 233 of the knife 234 thereby supporting the knife in its upward position. The finger 231 slides in a slot (not shown) in the upper end 243 of the bracket 244 which is suitably fixed to the bracket 229'.

The ballot 14 has on the edges 116 and 117 the stubs 245 and 246 having imprinted thereon the characters 247 which, as previously mentioned, are intended to indicate the number of ballots voted. The upwardly extending knives 248 and 249 sever the stubs 245 and 246 from the strip 51' as the strip is moved forwardly as by operation of the hand contact handle 63.

After the stubs 245 and 246 are cut from the main body of the strip 51' they fall by gravitation into the boxes 251 and 252 fixed to the rear 6 of the casing 2 as by the rivets 253.

The ballots 14 are numbered successively on the stubs 245 and 246 while in the machine 1, thereby making possible the determination of the number of ballots previously voted and deposited in the ballot box at any time. The identifying numbers 247 are cut off making it impossible to detect one ballot from another, thus assuring a secret ballot as far as determining how any particular individual has voted. The votes are also deposited at random in the ballot box 19, thus making the identification of any particular voter's vote impossible.

An important advantage of the invention is that fraud in elections is practically eliminated, since no person handles a voted ballot until it is removed from the ballot box. Moreover, the voted ballots are deposited into the ballot box by the voters themselves and no ballot is visible to the voter except the ballot which he marked or voted. Moreover, use of the invention enables honest election officials, who may be accused of dishonesty, to furnish a record of each detail operation of the machine which may be used as evidence to prove untruth of the charge of dishonesty.

Another advantage of the invention is that all of the voted ballots are deposited automatically into the ballot box in such a manner that subsequently one voted ballot cannot be identified from another voted ballot. Therefore, possibility is eliminated of any one determining for whom or for what proposition any voter voted. Also, each ballot has imprinted thereon characters to identify the ballots voted in different machines at different locations.

Still another advantage of the invention is that the stubs are automatically removed from the ballots without possibility of any ballot being mutilated. Also, the ballots are of flexible cardboard and not folded, whereby if desired a counting machine may be practically utilized for counting and punching the voted ballots, or the ballots may be conveniently stacked and counted without aid of mechanism.

Still another advantage of the invention is that when a considerable number of voters collect at the voting poll for the purpose of voting, such voters may be arranged in lines leading to the various voting machines, whereby confusion is avoided and at the same time the voters may vote rapidly and efficiently without any loss of time. Also, fewer election attendants are required since only two persons are required to register the voters and two persons are required to unlock the voting machines to permit voters to vote. Also, the machine cannot be opened by any one during election hours for the purpose of removing or tampering with the voted ballots.

It is, therefore, quite apparent that I have invented a highly desirable and practical device for the purposes intended and that utilization of the invention will reduce the normal election costs, as well as enabling voters to vote quickly and positively without likelihood of any person becoming informed of the persons or propositions for whom respective voters voted.

It is apparent that I have devised a novel and useful structure which embodies the features of advantages enumerated, and while I have, in the present instance, shown and described preferred embodiments thereof which will give in practice satisfactory and reliable results, it is to be understood that the same is susceptible of modification in various particulars. In other words, it is apparent that the parts of the invention may be of any size and constructed of any materials deemed convenient and suitable for an article of this character, and while I have illustrated and described a form of construction and arrangement of the elements found desirable in materializing the invention, I wish to emphasize the fact that I desire to include in this application all equivalents and substitutes that may fairly be considered to come within the scope and purview of the invention as defined in the claims. For instance, instead of the ballots being arranged in stacks or strips suitable mechanism may be provided for placing single and separated ballots on the writing board.

What I claim as new and desire to secure by Letters Patent is:

1. In mechanism of the class described, a casing having an opening in its top, a lid hingedly connected with said casing and which may be manually moved from an open position to a closed position and moved from a closed position to an open position, means for feeding a ballot past said opening, manually operative means for operating said first mentioned means and being operatively connected with said first mentioned means immediately after said lid is in closed position and before said manually operative means is operated to operate said first mentioned means, a segment rotatably mounted in said casing, means to lock said lid in closed position, means to force said lid toward open position when said lid is unlocked, means to rotate said segment to a predetermined position when said lid is unlocked and forced from closed position toward open position, means operated by said segment during its rotatable movement to cause said first mentioned means to be operatively connected with said second mentioned means, and means operated by rotation of said segment, when said ballot is being fed past said opening, to cause said first mentioned means to be inoperative with respect to said second mentioned means.

2. In mechanism of the class described, a casing having an opening therein, a lid hinged to said casing and which may close said opening when said lid is in closed position, operative means for moving a votable ballot to and past said opening, manually operative means for operating said first mentioned means, a segment rotatably mounted in said casing, means to urge said lid into open position to make said ballot accessible to a voter, means to urge said segment in one direction, means to cause movement of said segment in another direction when said manually operative means are operated, means to retain said segment in a predetermined position during a portion of the travel of said lid toward open position and to subsequently permit said segment urging means to move said segment in said one direction and into a predetermined position, releasable means to retain said segment in said last mentioned predetermined position, means operative by said segment during its travel in said one direction which causes said manually operative means to be operatively connected with said first mentioned means, and means operative by said segment during its travel in said other direction which causes said manually operative means to be inoperative with respect to said first mentioned means.

3. In mechanism of the class described, a casing having an opening therein, a lid hinged to said casing and which may close said opening when said lid is in closed position, operative means for moving a votable ballot to and past said opening, manually operative means for operating said first mentioned means, a segment mounted in said casing, means to urge said lid into open position to make said ballot accessible to a voter, means to urge said segment in one direction, means to retain said segment in a predetermined position during a portion of the travel of said lid toward open position and to subsequently permit said segment urging means to move said segment in said one direction and into a predetermined position, releasable means to retain said segment in said last mentioned predetermined position, means operative by said segment during its travel in said one direction which causes said manually operative means to be operatively connected with said first mentioned means.

4. In mechanism of the class described, a casing having an opening therein, a lid hinged to said casing and which may close said opening when said lid is in closed position, operative means for moving a votable ballot to and past said opening, manually operative means for operating said first mentioned means, a segment rotatably mounted in said casing, means to urge said lid into open position to make said ballot accessible to a voter, means to urge said segment in one direction, means to cause movement of said segment in another direction when said manually operative means are operated, means to retain said segment in a predetermined position during a portion of the travel of said lid toward open position and to subsequently permit said segment urging means to move said segment in said one direction and into a predetermined position, means to prevent further rotation of said segment while said lid is in an open position, means operative by said segment during its travel in said one direction which causes said manually operative means to be operatively connected with said first mentioned means, and means operative by said segment during its travel in said other direction which causes said manually operative means to be inoperative with respect to said first mentioned means.

5. In mechanism of the class described, a casing having an opening therein, a lid hinged to said casing and which may close said opening when said lid is in closed position, operative means for moving a votable ballot to and past said opening, manually operative means for operating said first mentioned means, a segment mounted in said casing, means to urge said lid into open position to make said ballot accessible to a voter, means to urge said segment in one direction, means to retain said segment in a predetermined position during a portion of the travel of said lid toward open position and to subsequently permit said segment urging means to move said segment in said one direction and into a predetermined position, means operative by said segment during its travel in said one direction which causes said manually operative means to be operatively connected with said first mentioned means.

6. In a device of the class described, a casing containing a vote receiving strip, mechanism for feeding said strip, manually operative means adapted to be operatively connected with said mechanism, a lid connected with said casing and which may be manually closed for covering a portion of said strip, means to urge said lid to an open position, and means adapted to automatically operate while said lid is being urged to an open position and render said manually operative means inoperative with respect to said feeding mechanism, and controlling means to permit said manual means to be operative with said feeding mechanism after said lid is in closed position.

7. In a device of the class described, a casing containing a vote receiving strip, mechanism for feeding said strip, manually operative means adapted to be operatively connected with said mechanism, a lid connected with said casing and adapted to be manually closed for covering a portion of said strip, means to urge said lid toward open position, and means adapted to automatically operate while said lid is being urged toward open position and render said manually operative means inoperative with respect to said feeding mechanism.

8. In mechanism of the class described, a casing having an opening therein, a lid movably connected with said casing and which may be manually moved from an open to a closed position, said lid being adapted to close said opening when in closed position, means for feeding a ballot past said opening, manually operative means for operating said first mentioned means and being operatively connected thereto immediately after said lid is manually forced in closed position and before said manually operative means is operated to feed said ballot past said opening, a segment rotatably mounted in said casing and being operatively connected with said manually operative means immediately after said lid is closed and before said manually operative means is operated to feed said ballot past said opening, means operated by rotation of said segment in one direction caused by operation of said manually operative means to cause said manually operative means to be inoperative with respect to said segment and with respect to said feeding mechanism, releasable means to retain said lid in closed position, means to automatically urge said lid to partly open position when said releasable means are released, means to automatically rotate said segment in a direction different from said one direction after said lid is urged to a partly open position, means operated during said last mentioned rotation of said segment to cause said manually operative means to be operative with respect to said segment and with respect to said feeding mechanism after said lid is closed.

9. In mechanism of the class described, a casing having an opening therein, a lid movably connected with said casing and which may be manually moved from an open to a closed position, said lid being adapted to close said opening when in closed position, means for feeding a ballot past said opening, manually operative means for operating said first mentioned means and being operable after said lid is manually forced in closed position and before said manually operative means is operated to feed said ballot past said opening, a segment rotatably mounted in said casing and being operatively connected with said manually operative means immediately after said lid is closed and before said manually operative means is operated to feed said ballot past said opening, means operated by rotation of said segment in one direction caused by operation of said manually operative means to cause said manually operative means to be inoperative with respect to said segment and with respect to said feeding mechanism, releasable means to retain said lid in closed position, means to urge said lid to open position when said releasable means are released.

10. In a device of the class described, a casing having an opening, a lid to close the opening, means to feed a ballot past the opening, manually operative means controlled by said lid to operate said means, said manually operative means being operative with respect to said first mentioned means when said lid is closed and before said ballot is fed past said opening, and means operated by said manually operative means to cause it to be inoperative with respect to said first mentioned means, and means to cause said manually operative means to be operatively connected with said first mentioned means when said lid is opened.

11. In a mechanism of the class described, a casing having an opening at its top and having slots therein, a lid hingedly connected with said casing to close said opening, means for feeding a voting strip past said opening, manually operative means for operating said means, a segment rotatably mounted in said casing and having a flange on its inner edge, a pair of upper and a lower spaced apart curved bars being fixed to the lower side of said lid and being slidable in said slots, means operated by movement of said segment in one direction to cause said manually operative means to be operatively connected with said first mentioned means and means operated by movement of said segment in another direction to cause said manually operative means to be inoperative with respect to said first mentioned means, means to automatically rotate said segment in one direction and said flange being adapted to cooperate with said bars to restrict movement of said segment.

12. In mechanism of the class described, a casing having an opening at its top, a lid hingedly connected with said casing which may close said opening, means for feeding a voting strip past said opening, manually operative means for operating said means, a segment rotatably mounted in said casing, means operated by movement of said segment in one direction to cause said manually operative means to be operatively connected with said first mentioned means and means operated by movement of said segment in another direction to cause said manually operative means to be inoperative with respect to said first mentioned means.

WENDELL B. CAMPBELL.